Aug. 30, 1932. G. T. PARR 1,874,608
MACHINE FOR MAKING PIE SHAPED RECEPTACLES
Original Filed May 25, 1923 2 Sheets-Sheet 1
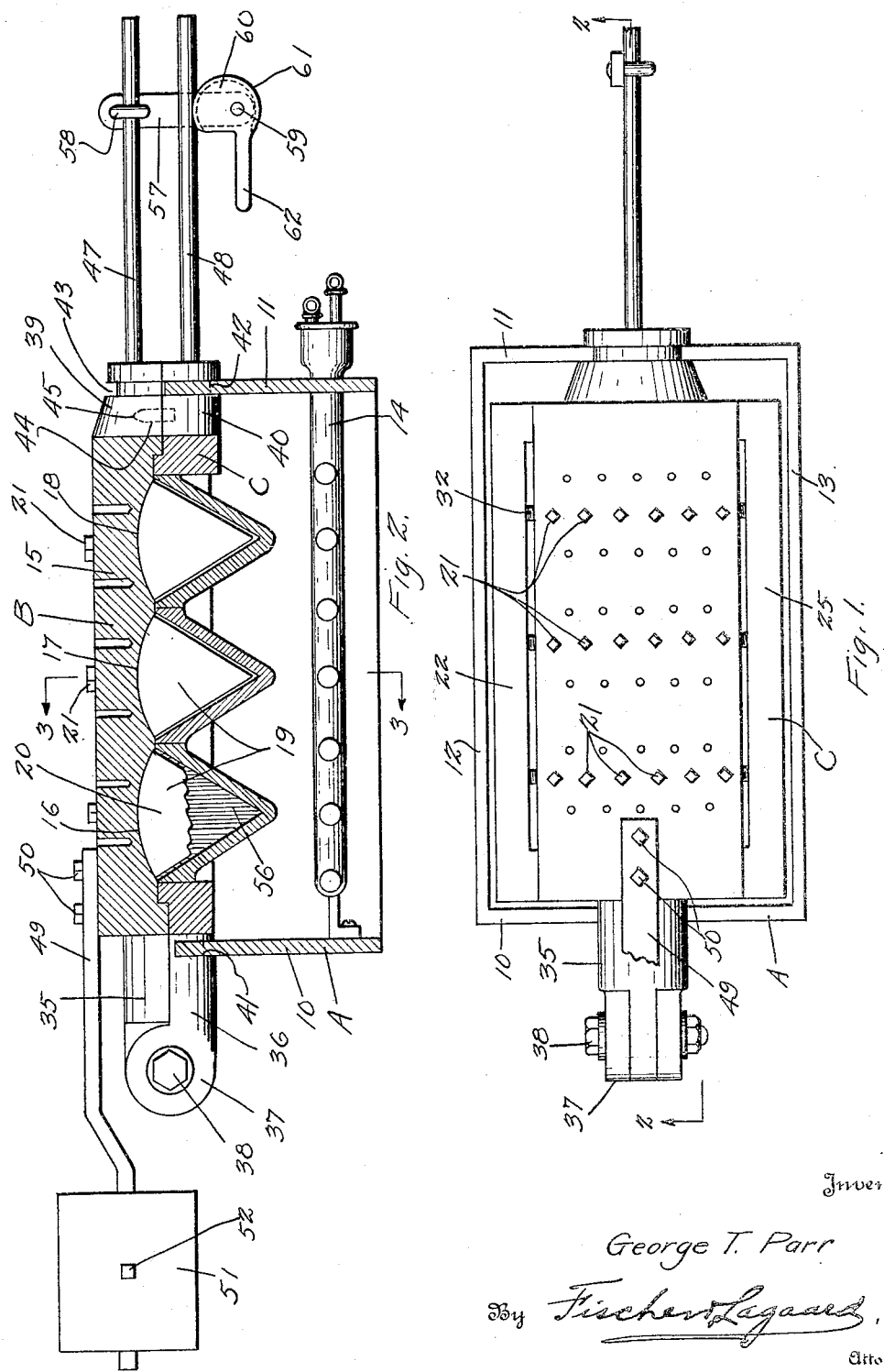
Inventor
George T. Parr
By Fischer & Lagaard,
Attorneys Aug. 30, 1932.   G. T. PARR   1,874,608
MACHINE FOR MAKING PIE SHAPED RECEPTACLES
Original Filed May 25, 1923   2 Sheets-Sheet 2
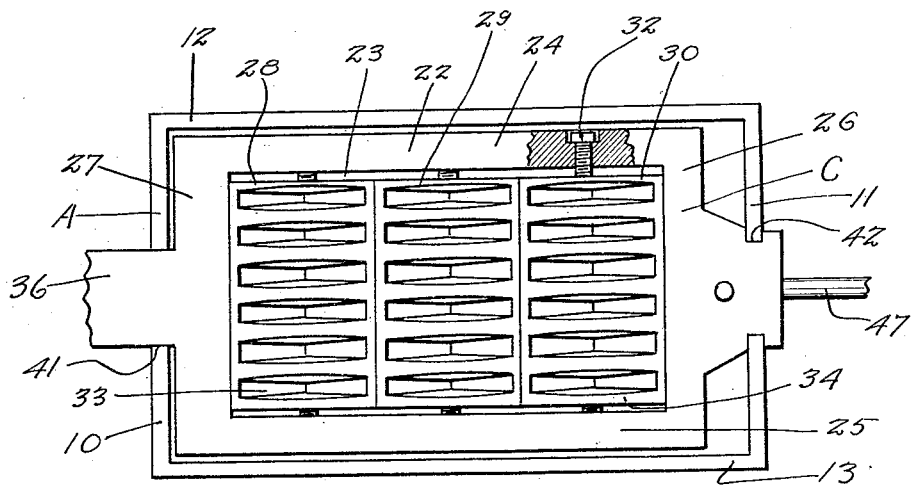
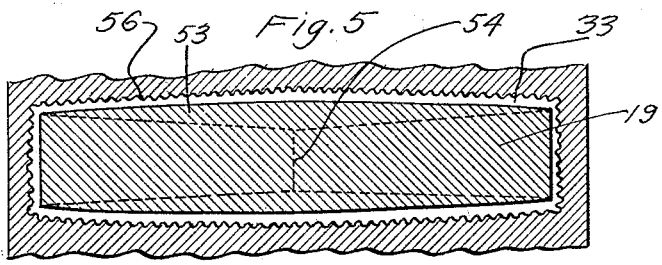
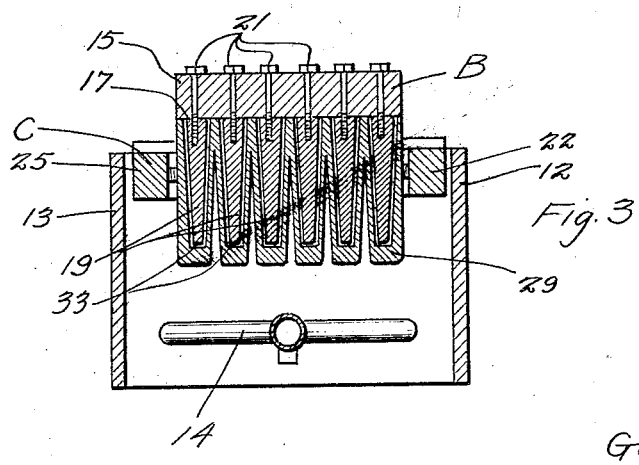

Patented Aug. 30, 1932

1,874,608

UNITED STATES PATENT OFFICE

GEORGE T. PARR, OF ST. PAUL, MINNESOTA

MACHINE FOR MAKING PIE SHAPED RECEPTACLES

Application filed May 25, 1923, Serial No. 641,514. Renewed November 27, 1931.

My invention relates to machines for making pie-shaped receptacles and has for its object to provide a male and female mold having a plurality of mold members positioned adjacent one another simulating the shape of a piece of pie.

Another object is to provide a frame in which the female mold members may be collectively mounted, so that the said mold members may be interchanged or replaced at will.

Another feature of the invention resides in providing an upper plate-like member having parallel arcuated furrows which serves as a bed for the male members of the mold in which the curved portions of the male members of the mold may be collectively positioned and attached.

The still further object of the invention is to provide the sides of the mold member with a slight amount of curvature so that the receptacles upon being baked assume a plane formation after the same are completed.

A still further object is to provide the mold with corrugations adapted to run at right angles to the plane of the mold parting surface.

Another object of the invention is to provide means for clamping the mold members together so that the mold may be handled as a single unit.

A still further object is to provide a rectangular enclosing support in which the said mold may be rotated and to position at the lower portion of said enclosure a heating element attached to the sides of the mold.

The full objects will be found in the detailed description thereof, and are particularly pointed out in the claims.

In the drawings forming part of this specification:

Figure 1 is a plan view of my invention with portions cut away.

Figure 2 is a longitudinal sectional view taken on the line 2—2 of Figure 1.

Figure 3 is a sectional view taken on the line 3—3 of Figure 2.

Figure 4 is a plan view similar to Figure 2, with the upper mold member removed.

Figure 5 is an enlarged plan sectional view of the dies of the mold.

My invention provides a machine whereby receptacles in the shape of a piece of pie may be constructed, which receptacles may be coated on the exterior with chocolate or any other suitable icing, and the same filled with ice cream or any desired confection. The machine is adapted to be manipulated by hand and operates by baking a batter spread upon the mold members of the same, to form an edible receptacle having the arcuated end of the same open for the reception of the contents thereof.

The device consists of an enclosing support A which has end walls 10 and 11 and side walls 12 and 13, all integrally connected and being arranged open at the top and bottom. At the lower portion of the support A is positioned a gas burner 14 which operates in the usual manner to heat the mold members of the machine. The mold proper which comprises an upper section B and a lower section C is supported within the enclosing support A in a manner to be presently described so that the flames from the gas burner 14 strike the said mold member, thereby heating the same and baking the receptacles positioned therein.

The construction of the mold proper can best be seen in Figures 2, 3 and 4. The upper section B consists of a bed 15 which is provided with a number of transverse arcuated furrows 16, 17 and 18, extending completely across the same. Within these furrows are positioned a plurality of wedge-shaped male die members 19 which have curved ends 20 adapted to fit into the respective furrows 16, 17 and 18. These die members are held attached to the bed 15 by means of cap screws 21 which pass through the said male die members. The members 19 as shown in Figure 3 are spaced from one another and are arranged in parallel rows.

The construction of the lower mold member C is as follows: This member consists primarily of a rectangular frame 22 which is formed with a rectangular opening 23 in the center of the same, said frame having sides 24 and 25 and ends 26 and 27. Within the opening 23 of the frame 22 is positioned three female die members 28, 29 and 30, which are arranged adjacent one another and are held clamped between the sides 24 and 25 of the frame 22 by means of cap screws 32 engaging the ends thereof. These cap screws, as will be noted in Figure 4, are recessed into the sides 24 and 25 of the frame 22 so that the same lie flush with the outer surface of said frame.

Each of the female die members 28, 29 and 30 is chilled casting and is formed with a plurality of wedge-shaped pockets 33 which are of the same general formation as the wedge-shaped die member 19, excepting that the same have the arcuated ends thereof open. It will be further noted that the upper surface indicated at 34 of the female die members 28, 29 and 30 is curved to fit the arcuated furrows 16, 17 and 18 of the bed 15 so that when the mold members B and C are clamped together, a tight connection along the upper surface of said mold is provided.

The structure for connecting the mold member together and supporting the same consists of two semi-cylindrical arms 35 and 36 which issue rearwardly from the bed 15 and frame member 22 and which are hingedly connected at their ends 37 by means of a bolt 38. At the forward end of the mold member I provide two semi-cylindrical struts 39 and 40 which issue outwardly from the forward end of the bed 15 and the front end 26 of the frame 22, said struts being arranged in axial alignment with the arms 35 and 36. The entire mold is held supported in two semi-circular notches 41 and 42 formed at the centers of the walls 10 and 11 of the supporting member A at the upper portions thereof as can be seen in Figure 2. The arms 35 and 36 rest in the slot 41 while the struts 39 and 40 are provided with an annular groove 43 extending around the same and rest in the slot 42. By this means the entire mold may be rotated as a unit in notches 41 and 42 so that either of the surfaces thereof may be successively exposed to the heat generated by the burner 14 as desired. For guiding the forward end of the mold members together, I provide a dowel pin 44 which is attached to the diametrical face of the strut 40 and co-operates with a registering hole 45 in the strut 39 in the usual manner.

For manipulating the device a pair of handles 47 and 48 are employed which are rigidly secured to the struts 39 and 40 and which extend outwardly from the mold proper. By means of the handles the mold members B and C may be operated as desired so as to open or close the mold. To facilitate manipulation of the mold in the opening or closing of the same, I provide an arm 49 which is bolted to the rearward end of the bed 15 by means of bolts 50. This arm has attached to it a counter weight 51 which is adjustably held thereon by means of a screw 52. In this manner the handle 47 may be easily raised to open the mold and the mold member B remains stationary when left in a vertical position.

The exact construction of the die members employed in my invention can be seen in Figure 2 and in detail in Figure 5. Each of the male die members 19 is formed with the upper arcuated ends of the same slightly bowed outwardly as indicated at 53. At the same time the sides of the die member taper toward the point as can best be seen in Figure 3 making the extreme point 54 of the die member at its upper end. This permits of readily withdrawing the receptacles from the mold and of separating the die members. As will be noted in Figure 5, the formation of pockets 33 in the female die members is similar in shape to the male die members, the walls of said pockets being spaced from the sides of said male die members to form the space which the batter occupies. It will be further noted that the walls of the female die members are formed with corrugations indicated at 56 which extend vertically relative to the mold. These corrugations assist in causing the chocolate or icing whenever the same is used to adhere to the surface of the receptacles.

For forcing and locking the handles 47 and 48 together, I employ a device shown in Figure 2. This device consists of a bar 57 which extends across both of said handles and which is rotatably and slidably mounted upon the upper handle 47 by means of an eye bolt 58 secured thereto. At the lower end of said bar is pivotally attached at 59 an eccentric disc 60 adapted to ride against the lower handle 48. This disc is formed with an annular groove 61 which engages the handle 48 and has a lever 62 issuing outwardly from the same by means of which said disc may be operated. It can readily be comprehended that when the handles 47 and 48 are brought together that the bar 57 may be swung to bring disc 60 below the handle 48 when the lever 62 has been thrown forwardly. Upon the raising of said lever, the eccentric disc 60 is caused to bear against the lower handle 48 and to force said handles together to rigidly clamp the mold structure in place.

When so clamped, the mold may be readily rotated in the notches 41 and 42 as a unit to successively expose both sides of the same to the action of the burner 14.

In using my invention, the mold member C is placed downwardly with the pockets 33 positioned as shown in Figure 3. The member B is then swung upwardly on the pivot 38 so that the lower mold member C is exposed as shown in Figure 4. In this position the batter, preferably of a freely flowing consistency, is poured over the mold member C so that the same runs down into all of the pockets 33. After closing the mold member B and clamping the same together, the mold is heated by means of the burner 14 on both sides thereof until the receptacle is suitably baked. When the mold is then opened, the receptacles may be easily removed therefrom, after which the same are trimmed and coated as before described if desired.

The advantages of my invention are manifest. A simple construction is provided in which pie-shaped receptacles may be readily baked in large quantities. By forming the female die member of a chilled casting the molds may be placed close enough together so that a great number may be secured in a relatively small space, thereby greatly increasing the capacity of the machine and reducing the cost of manufacture of the receptacles. By supporting the female die members within the rectangular frame, the same may be independently adjusted to fit the male die members and individual sections may be removed and replaced as desired. The arcuated furrows provided on the bed support the male die members so that the same are arranged in uniform formation.

In accordance with the patent statutes, I have described my invention, illustrating the best embodiment thereof, but I desire to have it understood that the invention can be carried out by other means and applied to uses other than those above set forth within the scope of the following claims.

I claim:

1. A receptacle forming machine comprising a bed, a plurality of arcuated furrows formed thereon, a plurality of male die members having curved ends adapted to lie in said furrows, and female die members co-operating with said male die members.

2. A receptacle forming machine comprising a bed, a plurality of arcuated furrows formed thereon, a plurality of male die members having curved ends adapted to lie in said furrows, female die members adapted to co-operate with said male die members, and curved ends formed on said female die members for engaging the arcuated furrows of said bed.

3. A receptacle forming machine comprising a bed, a plurality of arcuated furrows formed thereon, a plurality of male die members having curved ends adapted to lie in said furrows, said male die members being spaced from one another, and female die members having a plurality of pockets adapted to co-operate with said male die members.

4. A receptacle mold comprising, a female die member of sector shape, the walls of said die member being bowed outwardly in the center thereof, and a male die member co-operating therewith.

5. A receptacle forming machine comprising, a bed, a die member having a curved end supported by said bed, said bed being provided with means adapted to receive the curved end of said die member, and a die member having a pocket adapted to receive the first mentioned die member.

6. A mold for cuneiform edible receptacles including, a socket for receiving batter to form said receptacle having sector-shaped side walls therein, and side edges connecting said side walls tapering from the apex of said socket toward the outer end thereof, and a molding member co-operating with said socket to form the hollow edible.

7. A mold for cuneiform edible receptacles including, a female die comprising a pair of spaced sector-shaped walls, connecting edges between said walls tapering from the apex of the sector toward the curved edge thereof, and a male die member smaller than and complementary with said female die.

8. A mold for cuneiform edible receptacles including, a female die comprising a pair of spaced sector-shaped walls, side edges connecting said walls, said sector-shaped walls bowing outwardly adjacent the curved side thereof.

9. A mold for cuneiform edible receptacles including, a female die comprising a pair of spaced sector-shaped side walls, side edges tapering outwardly from the apex of said walls connecting said walls, an open side between the curved edges of said sector-shaped walls, said curved edges bowed outwardly from said open side.

GEORGE T. PARR.